July 13, 1937. W. R. WOOD 2,086,760
STOKER
Filed Dec. 5, 1933 5 Sheets-Sheet 1

INVENTOR
Wilfred R. Wood
BY
Synnestvedt & Lechner
ATTORNEYS

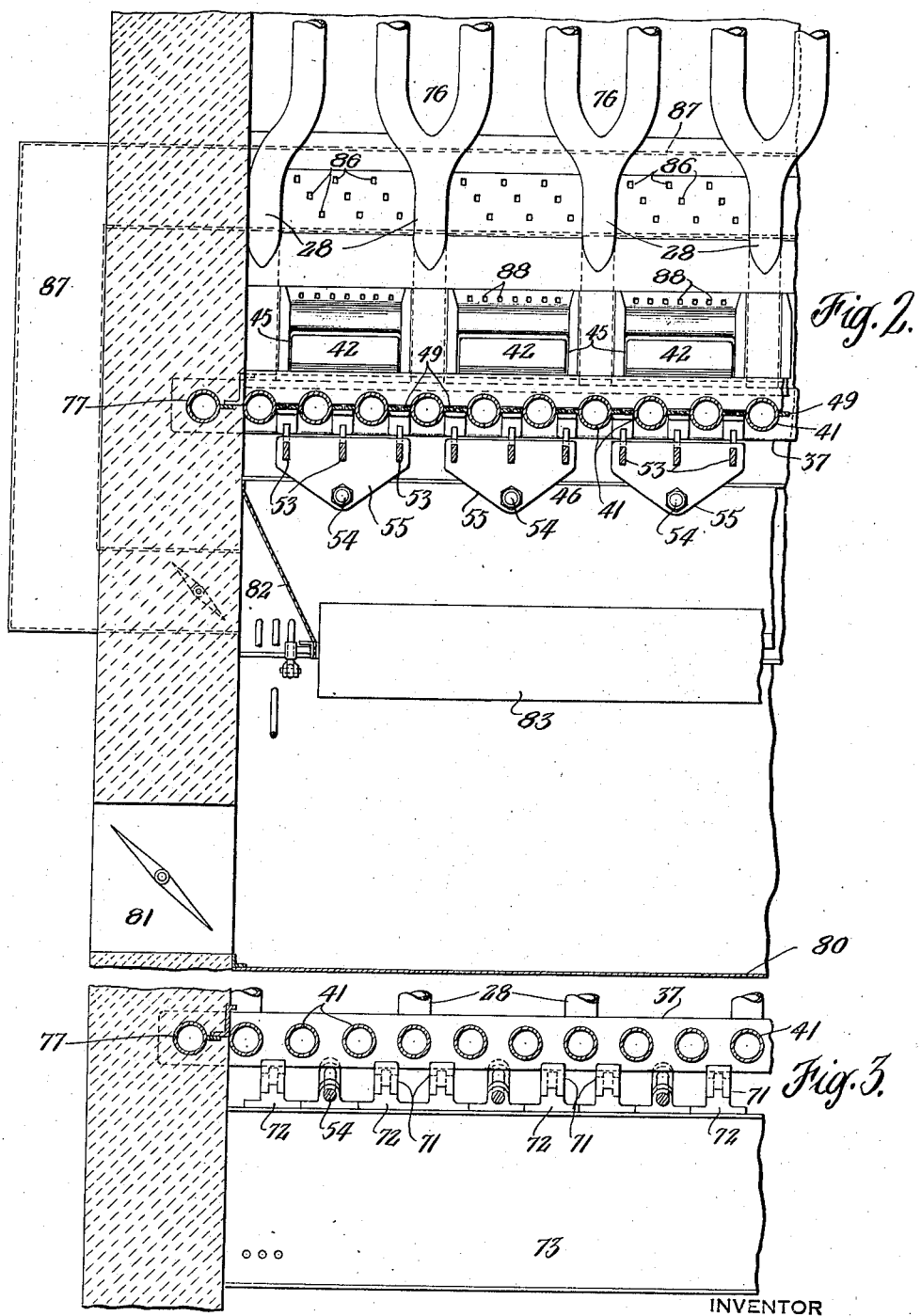

July 13, 1937.  W. R. WOOD  2,086,760
STOKER
Filed Dec. 5, 1933   5 Sheets-Sheet 3
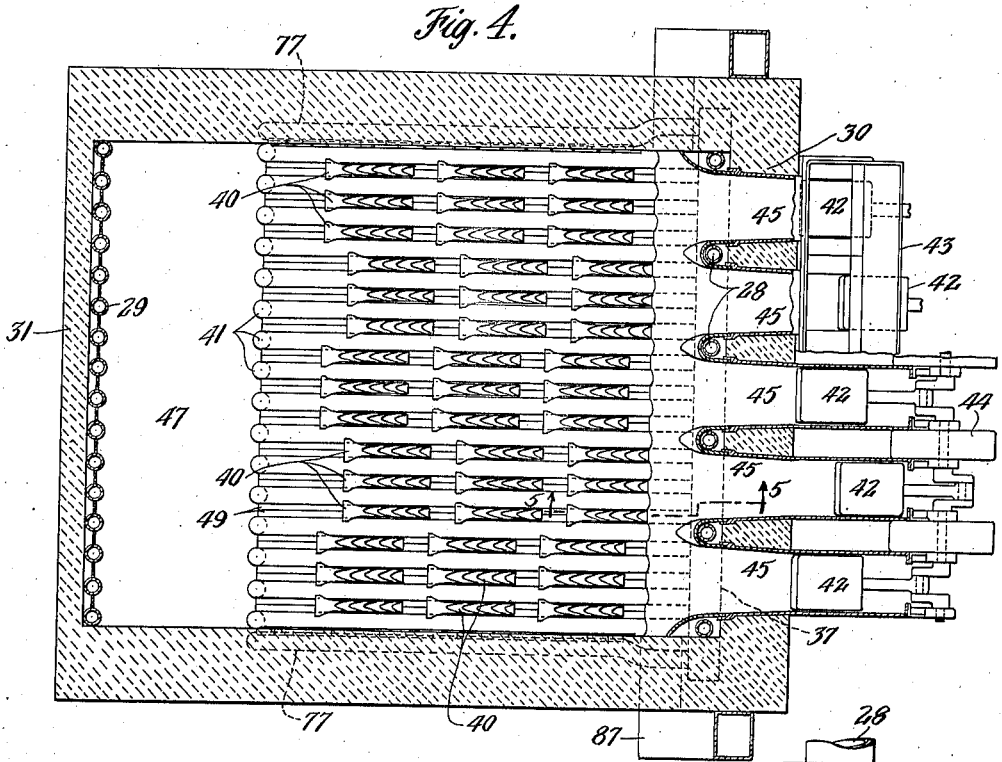
Fig. 4.
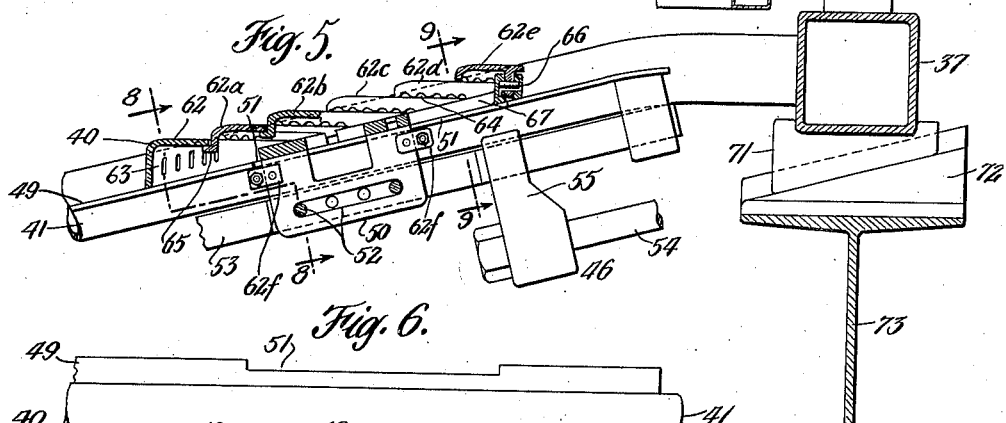
Fig. 5.
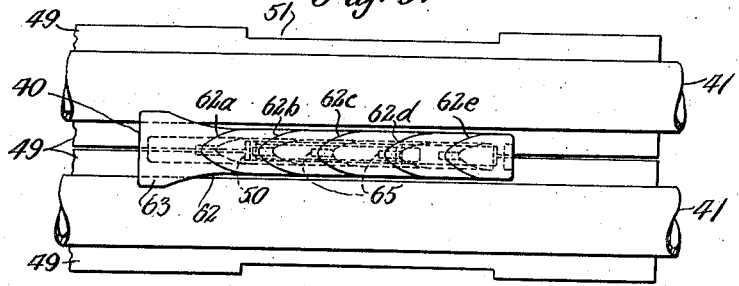
Fig. 6.
Fig. 7.
INVENTOR.
Wilfred R. Wood
BY
Synnestvedt & Lechner
ATTORNEYS

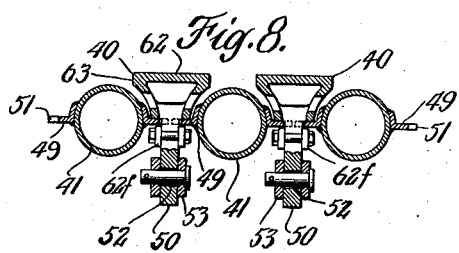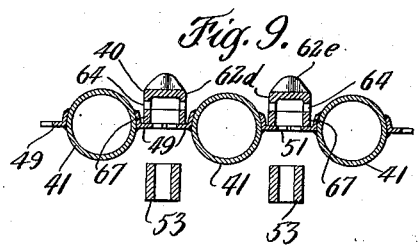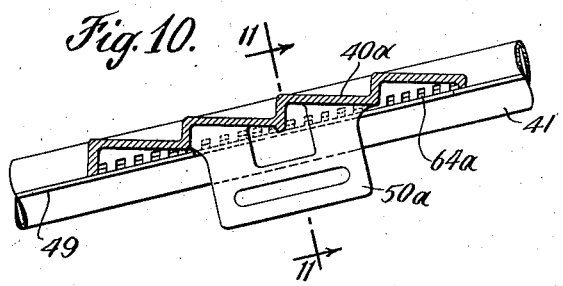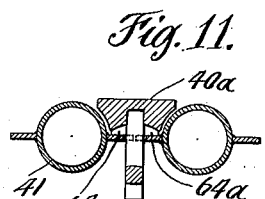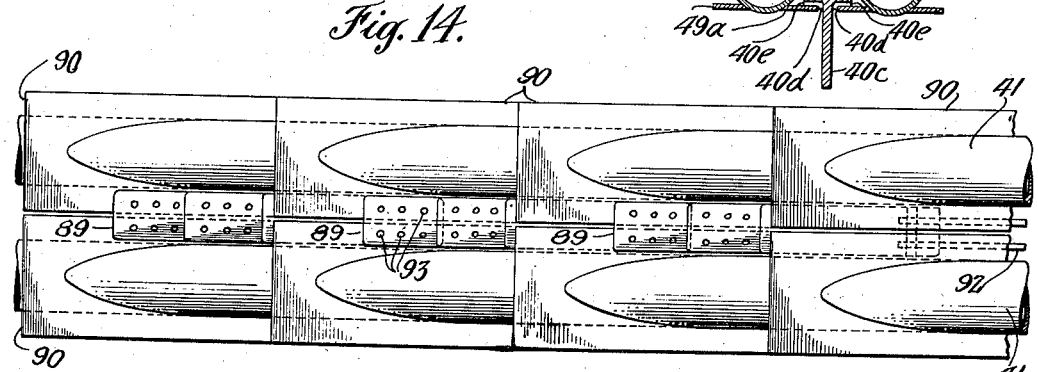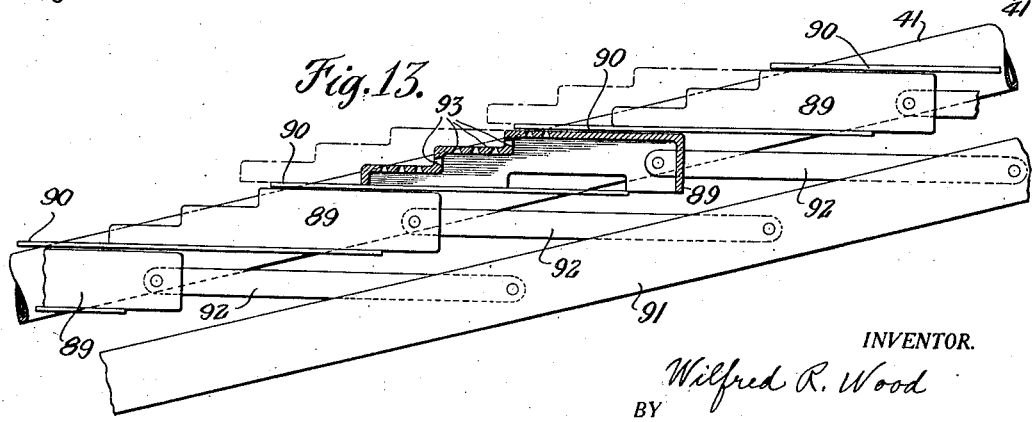

July 13, 1937.  W. R. WOOD  2,086,760
STOKER
Filed Dec. 5, 1933    5 Sheets-Sheet 5
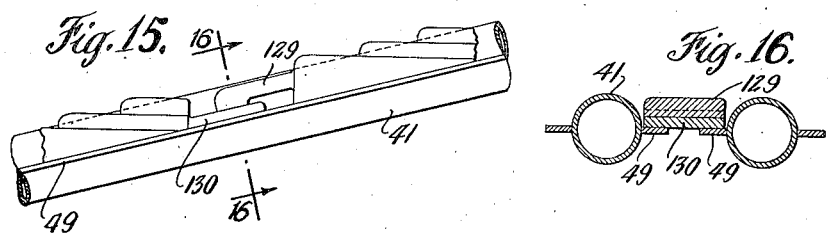
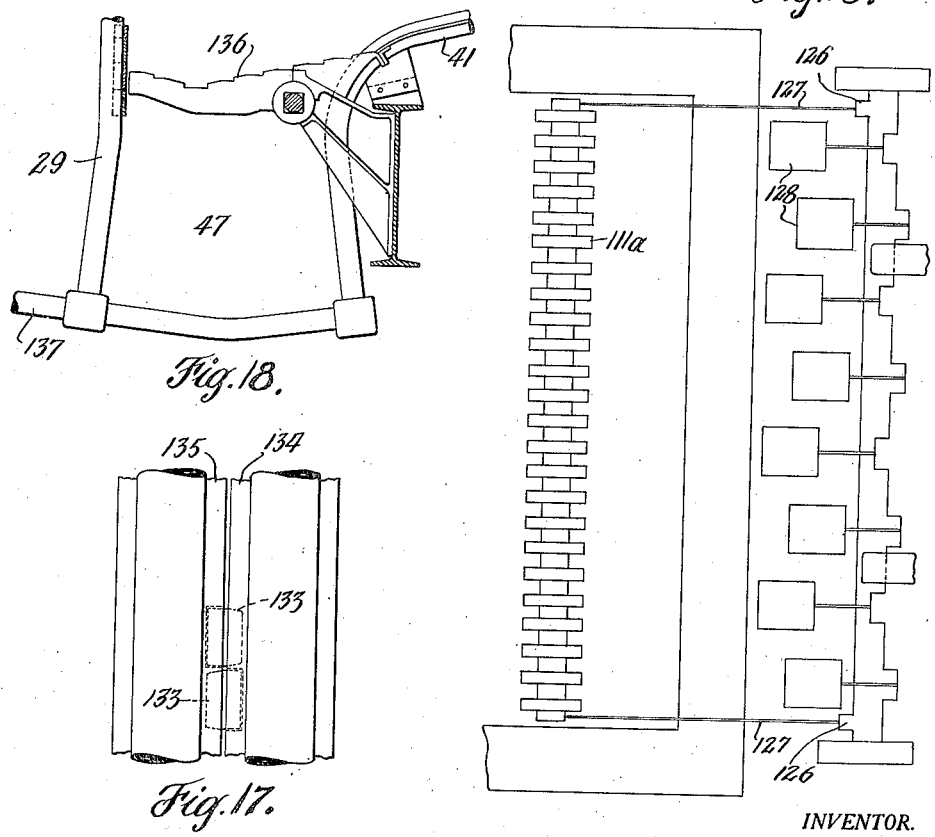
INVENTOR.
Wilfred R. Wood
BY Synnestvedt + Lechner
ATTORNEYS Patented July 13, 1937

2,086,760

UNITED STATES PATENT OFFICE 2,086,760

STOKER

Wilfred Rothery Wood, New York, N. Y., assignor to Combustion Engineering Company, Inc., New York, N. Y., a corporation of Delaware Application December 5, 1933, Serial No. 700,946

15 Claims. (Cl. 122—376)

This invention relates to fluid cooled stokers. Such stokers have been heretofore proposed and the general purpose of the present invention is to provide an effective stoker of this type which is capable of being operated at high rates, and, if desired, with the use of highly pre-heated combustion air.

There is a limit of rating at which mechanical stokers can be operated, particularly with preheated combustion air, because of the temperature to which the stoker parts in proximity to the burning fuel may be safely raised. Beyond such temperature, warping and burning out of certain of the parts occur. Hence, more specifically, it is an object of the invention to provide a simple and effective arrangement of the cooling parts, whereby not only warping and burning out of the stoker parts proper, but also warping and burning out of the cooling parts themselves, are avoided.

Another object of the invention is to correlate the cooling parts with the fuel supporting and fuel advancing parts of the stoker so that all of the parts co-operate to produce a stoker which is simple in construction; has long life; is not liable to get out of order; and in which sifting through of riddlings is greatly minimized.

I also aim to provide an arrangement in which expansion and contraction of the parts is provided for.

Still another object of the invention is to provide a circulation for the cooling parts which is effective in accomplishing the foregoing ends.

Other objects have to do with certain mechanical features and combinations of parts, as will hereinafter appear.

How the foregoing together with such other objects and advantages as may hereinafter appear or are incident to my invention, are realized is illustrated in preferred form in the accompanying drawings, wherein:—

Fig. 2 is a fragmentary vertical cross section taken substantially on the line 2—2 of Figure 1;

Fig. 3 is a fragmentary vertical cross section taken substantially on the line 3—3 of Figure 1;

Fig. 4 is a plan section taken substantially on the line 4—4 of Figure 1, with a porton of the fuel hopper appearing in full plan view;

Fig. 5 is an enlarged fragmentary longitudinal section taken substantially on the line 5—5 of Figure 4;

Fig. 6 is a fragmentary plan view of Figure 5;

Fig. 7 is a fragmentary cross section on the line 7—7 of Figure 1;

Figure 1:
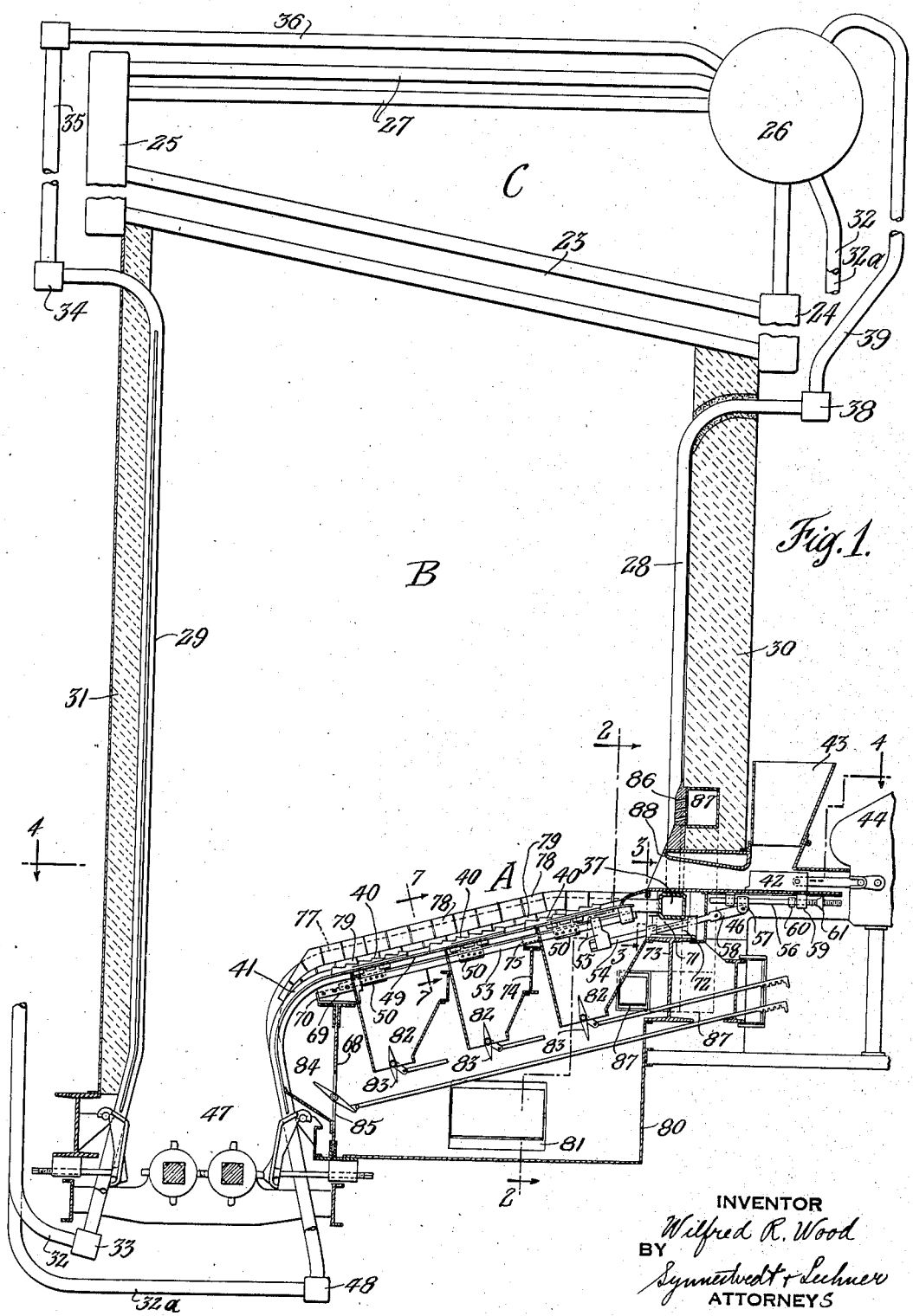
Fig. 1 is a vertical section through a boiler and furnace installation embodying a stoker constructed in accordance with my invention.

Figs. 8 and 9 are fragmentary cross sections taken on the lines 8—8 and 9—9 respectively, of Figure 5;

Fig. 10 is a longitudinal section similar to Figure 5, but showing a modification of the invention;

Fig. 11 is a cross section taken on the line 11—11 of Figure 10;

Fig. 12 is a cross section similar to Figure 11, but showing another modification of the invention;

Fig. 13 is a fragmentary longitudinal view similar to Figure 5 and showing a further modification of the invention with one of the grate bars or pusher elements shown in section;

Fig. 14 is a fragmentary plan view of Figure 13;

Fig. 15 is a longitudinal view similar to Figures 5 and 10, but illustrating another modification of the invention;

Fig. 16 is a cross section taken on the line 16—16 of Figure 15;

Fig. 17 illustrates a cooling tube detail;

Fig. 18 is a fragmentary view illustrating a dump grate at the ash discharge end of the stoker and also an arrangement of cooling tubes for the ash pit;

Fig. 19 is a diagrammatic view showing a modified arrangement of fuel feed.

Referring more particularly to Figures 1 to 9 inclusive, my improved stoker A is shown applied to a furnace B with which a boiler C is associated, the boiler comprising in this instance, a main bank of inclined boiler tubes 23 connected at their lower ends into a downtake header 24 and at their upper ends into an uptake header 25, an upper steam and water drum 26 and a plurality of tubes 27 leading from the header 25 to the steam and water drum 26.

In the furnace arrangement shown in Figure 1, steam evaporating tubes 28 and 29 are arranged at the front and rear walls 30 and 31 respectively and similar steam evaporating tubes may be employed at the side walls. Water is led to the steam evaporating tubes 29 by means of downcomer tubes 32 leading from the water space of the steam and water drum 26 to a lower header 33, into which the lower ends of the tubes 29 are connected. The tubes 29 are connected at their upper ends into an upper header 34 from which upcomer tubes 35 and 36 lead to the steam space of the steam and water drum 26. The tubes 28 at the front wall of the furnace are connected at their lower ends into a header 37 to which water is led in a manner hereinafter appearing and are connected at their upper ends into an upper header 38 which is connected by means of upcomer tubes 39 to the steam space of the steam and water drum 26.

The stoker A comprises in general, a plurality of grate bars or pusher elements 40, a plurality of cooling tubes 41, a plurality of feed rams 42, a fuel hopper 43 arranged to supply fuel to the rams, driving mechanism 44 for reciprocating the rams, a plurality of feed openings 45 in the front wall 30 of the furnace through which fuel is fed by the rams to the grate surface of the stoker, and mechanism 46 for reciprocating the grate bars 40 to effect feed of fuel from front to rear of the grate.

The cooling tubes 41 are arranged longitudinally of the grate in the direction of fuel feed and are inclined downwardly from front to rear, and at the rear or ash discharge end of the grate, these tubes are further bent downwardly so as to provide a water cooled front wall for the ash pit 47.

The tubes 41 are connected at their lower ends into a lower header 48 to which water is led from the steam and water drum 26 by means of downcomer tubes 32a, and are connected at their upper ends into the lower header 37 of the front wall tubes 28. It will thus be seen that circulation is from the drum 26 downwardly through the tubes 32a, then upwardly through the cooling tubes 41 to the header 37, and from thence upwardly through the wall tubes 28 and finally to the steam space of the drum 26 through the medium of the upper header 38 and upcomers 39, and since the tubes 28 are vertically disposed and subject to high heat, very effective circulation through the cooling tubes 41 in ensured.

The cooling tubes 41 are spaced apart transversely of the grate and are provided with extended surfaces illustrated in Figures 1 to 9 in the form of lateral flanges 49 extending longitudinally of the tubes. These flanges may be welded to the tubes so as to be in thermal contact therewith.

The grate bars 40 are positioned between the spaced cooling tubes and are arranged to ride on the flanges 49, whereby any wear incident to movement of the grate bars is taken by the flanges, it being noted that the adjacent flanges of adjacent tubes substantially abut one another and act to absorb heat from the moving stoker parts and transmit it to the cooling elements or tubes.

The grate bars are provided with downwardly extending plate-like portions or lugs 50 passing through elongated slots 51 in adjacent flanges 49, and adjustably connected by means of pin and slot connections 52 to bars 53 located below the cooling tubes 41 and extending parallel thereto. In this instance, I have illustrated three longitudinally spaced grate bars 40, between each pair of cooling tubes, as clearly shown in Figures 1 and 4. Each such row of grate bars is connected to a bar 53 and the bars 53 are connected in groups of three to an actuating rod 54 by means of a cross head 55, as clearly shown in Figures 1, 2, and 5. The actuating rods and their connected grate members have reciprocatory motion imparted thereto from the feeder rams 42, to which connection is made by means of rods 56, blocks 57 and links 58 which parts constitute the mechanism 46 above referred to. Connection between the rods 56 and the rams 42 is made by means of downwardly projecting lugs 59 provided on the rams 42, collars 60, and adjusting nuts 61 provided on the rods 56. The nuts 61 may be adjusted to alter the strokes imparted to the grate bars.

Referring to Figure 4, it will be seen that in the particular stoker illustrated, five feeder rams are provided and that the grate bars are arranged in five transverse groups, each composed of three sets of three grate bars. The driving cranks of alternate rams are offset 180° and since each group of nine grate bars is connected to a different ram, they will be positioned in staggered relation, as shown in Figure 4. The stroke of any group of grate bars may be altered by adjusting the adjusting nut 61 of its reciprocating mechanism 46. The arrangement thus provided is one whereby the coal is fed uniformly across the width of the stoker with the result that a uniform fuel bed is maintained and unequal lanes of firing avoided.

The grate bars 40 illustrated in Figures 1 to 9 are in the form of units made up of a base member 62 having a perforated nose 63 at its lower end, and five removable sections 62a to 62e, each provided with air ports 64. Each removable section is provided with a lip 65 which hooks under the top surface of the adjacent section and the upper section 62e is secured to the lower section 62 by means of a key and locking pin 66 associated with a depending lug on the section 62e and upstanding lugs on the base portion 67 of the main section 62. Thus all of the parts referred to are secured together in a single unit or grate bar. Displacement of the grate bars in an upward direction is prevented by means of clips 62f secured to the depending lug 50 and co-operating with the flanges 49 of the cooling tubes.

In Figures 8 and 9 cross sections through the cooling tubes 41 and grate elements 40 are shown, it being noted that air passes from beneath the cooling tubes up between the adjacent flanges 49 into the interior hollow portion of the grate bars and out sideways through the air ports in the bars and into the fuel bed. The sides of the grate bars are preferably shaped to conform to the curvature of the tubes 41 whereby extended top grate surfaces are provided. These views clearly illustrate how the cooling elements and the bars provide the grate surface and also how any wear caused by movement of the grate bars relative to the fixed or stationary cooling elements is taken by the extended surfaces or flanges 49 which are in thermal contact with the tubes. The arrangement of the cooling tubes, the extended surfaces and the grate members is such that the riddlings are conveyed along the grate by the movement imparted to the pushers thus avoiding the sifting of riddlings through the grate.

Provision for expansion and contraction may be made by anchoring the cooling tubes at the point from which expansion is to take place and by supporting them at other points with freedom to move when expansion and contraction occurs. In the particular embodiment shown in the drawings, the cooling tubes 41 are anchored at the ash discharge end of the grate to the transverse supporting girder 68 by means of downwardly extending lugs 69 secured to the tubes and which are bolted to members 70 carried by the girder 68. Thus the tubes are free to expand longitudinally toward the forward or front end of the stoker. At this end the header 37 is seated in shoes 71 adapted to slide in guides 72 carried by the supporting girder 73. The shoe surfaces of the shoes and the corresponding surfaces of the guides 72 are inclined in the direction of expansion. At intermediate points additional support for the grate with freedom of expansion may be provided by means of intermediate girders 74 and similar shoe devices 75. The tubes 28 at the front wall of the furnace are spaced away from the wall to permit the lower header to shift as expansion of the cooling tubes 41 occurs. The wall tubes 28 expand upwardly for which purpose an expansion seal is provided where they pass through the wall. Expansion into the ash pit 47 occurs from the anchorage at the rear girder 68 downwardly, the lower header 48 being free to move in space and the downcomer tubes 32a being bent to enable such expansion. In some instances it may be desirable to provide the anchorage at the header 37 so that the expansion will be downwardly. Transverse expansion is taken care of by clearance between elements which, however, because of the arrangement, does not result in the sifting through of riddlings.

Referring now to Figures 1 and 2 the wall tubes 28 which act as risers for the cooling tubes of the grate are spaced apart sufficiently to permit of fuel feed in between them and onto the grate. However, in order to protect a greater furnace wall area by cooling surface above the fuel feed openings, these tubes 28 are bifurcated or divided into a plurality of tubes as shown at 76 in Figure 2 to provide closer tube spacing above the feed openings.

At the sides of the grate side wall cooling surface may be provided by means of tubes 77 equipped in this instance with heat absorbing blocks 78 (see Fig. 7). The adjacent tubes 41 may also be equipped with similar blocks 79 to complete the corner.

An air casing 80 is provided beneath the grate to which pre-heated air for combustion may be led through a damper controlled inlet 81 and from which pre-heated air may be led to the fuel bed through a plurality of inner casings 82 each provided with an individually controllable damper 83. Air may also be led from the casing 80 to the ash pit casing 84 through a damper controlled opening 85 and from thence to the ash pit either through spaces between the flanges 49 or through slots therein. The air so admitted cools the ash and causes more complete burning out of combustibles remaining in the ash.

Air is admitted above the fuel bed through a plurality of air openings 86 directed toward the fuel bed and to which pre-heated air is led from the casing 80 by means of a damper controlled conduit 87. Additional air may be admitted with the fuel through openings 88.

In Figures 10 and 11 I have illustrated a modified grate bar 40a of one piece construction and provided with a depending lug 50a for connection to its actuator and having side air openings 64a. In Figure 11 the sides of the grate bar 40a are in close proximity to the cooling surface, and the air is admitted to the fuel bed through the spaces between the bar and cooling surfaces. This close proximity shields the lower grate bars from the radiant heat of the fuel bed and subjects them to the radiant absorption of the cooled surfaces.

In Figure 12 I have illustrated still another modified form of grate bar 40b provided with a depending flange 40c which aids in cooling its top surface. In this instance the flanges or fins 49a on which the grate bars 40b slide are welded to the bottom of the cooling tubes 41 and the space between adjacent fins of adjacent tubes is such with respect to the thickness of the depending flange 40c that air may enter through spaces 40d and air openings 40e to the fuel bed, the arrangement being such that riddlings and siftings are prevented from passing downwardly.

In the modification illustrated in Figures 13 and 14 the cooling tubes 41 are inclined in a manner similar to that described in connection with Figure 1, but the grate bars or pushers 89 are horizontally disposed and ride on horizontal flanges 90 secured to the tubes 41 as by means of welding, and spaced longitudinally of the tubes. Reciprocatory movement is imparted to the grate bars by means of ram operated rods 91 and links 92. The front portions of the grate bars are of stepped formation and although the bars are horizontally disposed the grate surface presented thereby is generally inclined. In this form air is admitted to the fuel bed through openings 93 in the grate bars.

In Figure 19 I have shown a diagrammatic arrangement in which the uppermost group of pushers 111 are aligned and tied together across the full stoker width and reciprocated by a common drive such as cranks 126 and connecting rods 127. With this arrangement the fuel is fed longitudinally and uniformly across the width of the stoker, thereby avoiding lanes of uneven fuel feed. A multiplicity of small reciprocating rams 128 may be employed to feed fuel to the pushers 111a.

In Figures 15 and 16 an arrangement is illustrated in which the fins 49 are spaced sufficiently apart to permit the depending connecting lugs such as shown at 50 in Figure 5, to pass therebetween. In this case the grate bars are provided with extended ends 129 and 130 adapted to overlap and cover the openings between the fins at the points where the grate bars are spaced apart and thus prevent siftings from falling through. This construction also permits of a wider spacing of the cooling elements and enables wider grate bars to be employed. If desired, several grate bars may be attached together by employing securing means at the extensions 129 and 130.

In Figure 17, I have shown clips 133 alternately welded to the fin 134 of one cooling tube and to the fin 135 of the adjacent cooling tube arranged to interlock when the tubes are assembled in the stoker, whereby alignment is provided.

In Figure 18 the ash pit 47 is equipped with a dump grate 136. The rear wall tubes 29 of the furnace and the grate cooling tubes 41 are fed from common downcomers 137 which lead from the water space of the boiler.

I claim:

1. A water cooled grate comprising alternate cooling members and movable members to be cooled thereby, said cooling members being provided with lateral extended surfaces on which the movable members are supported and being spaced apart an amount leaving a space between the adjacent extended surfaces of adjacent cooling members, said movable members being arranged in groups spaced apart lengthwise of the grate, and means between said groups for covering the aforesaid space between the adjacent extended surfaces.

2. In a water cooled grate, the combination of movable grate members, spaced cooling tubes having longitudinally extending lateral flanges on which said grate members are supported, means for actuating said grate members, and means extending downwardly from the grate members for connecting them to said actuating means, said flanges being slotted at intervals along their length to accommodate said downwardly extending means and substantially closing the spaces between the tubes for the remainder of their length.

3. In a water cooled grate for stokers, the combination of movable grate bars, water tubes sloping downwardly from the front of the grate to the rear thereof, and horizontally disposed members in thermal contact with the tubes in spaced relation along the length of the tubes for supporting said grate bars in groups stepping downwardly from front to rear of the grate.

4. In a water cooled grate for stokers, the combination of spaced cooling tubes having lateral extensions thereon, the adjacent extensions of adjacent tubes being spaced apart, and movable grate bars located between said tubes and supported on said extensions, said grate bars having depending flanges passing through the spaces between adjacent extensions of adjacent tubes.

5. In a water cooled grate for overfeed stokers, the combination of spaced cooling tubes having longitudinally extending lateral flanges, reciprocatory grate members associated with said tubes, means for actuating said grate members, means extending downwardly from the grate members for connecting them to said actuating means, said flanges being slotted at intervals along their length to accommodate said downwardly extending means and substantially closing the spaces between the tubes for the remainder of their length.

6. In a water cooled grate for overfeed stokers, the combination of spaced cooling tubes having lateral extensions thereon, the adjacent extensions of adjacent tubes being spaced apart, and movable grate bars supported from the tubes at the spaces therebetween, said grate bars having depending flanges passing through the spaces between adjacent extensions of adjacent tubes.

7. A water cooled grate comprising alternate cooling members and movable members to be cooled thereby, lateral extensions on said cooling members on which the movable members are supported, the adjacent lateral extensions of adjacent cooling members being arranged to approximately abut, said movable members being arranged for reciprocation in a direction lengthwise of the grate, and said lateral extensions due to their approximate abutting relation minimizing the passage of riddlings through the grate and preventing fuel from falling through the grate as the movable members reciprocate.

8. A water cooled grate comprising alternate cooling members and movable members to be cooled thereby, lateral extensions on said cooling members on which the movable members are supported, the adjacent lateral extensions of adjacent cooling members being arranged to approximately abut, and said movable members being arranged in groups spaced apart lengthwise of the grate.

9. A water cooled grate for stokers comprising laterally spaced inclined cooling tubes extending longitudinally of the grate; means in thermal contact with the tubes substantially closing the spaces between tubes; and reciprocating grate bars at the spaces between cooling tubes arranged in groups spaced apart lengthwise of the grate, said grate bars together with portions of said cooling tubes and said thermally contacting means combining to provide a complete fuel supporting surface for the grate.

10. A water cooled grate for stokers comprising laterally spaced cooling tubes extending longitudinally of the grate and provided with laterally extended surfaces of such extent that adjacent extended surfaces of adjacent cooling tubes approximately abut, and movable grate members associated with said tubes at said extended surfaces arranged in groups spaced apart lengthwise of the grate, said cooling tubes and their laterally extended approximately abutting surfaces constituting fuel supporting surface for the grate where such surface is not provided by the grate members.

11. A water cooled grate for stokers comprising laterally spaced cooling tubes extending longitudinally of the grate and provided with laterally extended surfaces of such extent that adjacent extended surfaces of adjacent cooling tubes approximately abut, and movable grate members associated with said tubes at said extended surfaces arranged in groups spaced apart lengthwise of the grate, said movable grate members having openings therein for the admission of air to the fuel bed.

12. A water cooled grate for stokers comprising laterally spaced cooling tubes extending longitudinally of the grate and provided with laterally extended surfaces of such extent that adjacent extended surfaces of adjacent cooling tubes approximately abut, and movable grate members associated with said tubes at said extended surfaces arranged in groups spaced apart lengthwise of the grate, said movable grate members being of hollow form with closed tops and having openings in walls thereof for the passage of air to the fuel bed.

13. A water cooled grate for stokers comprising inclined laterally spaced water tubes extending downwardly from front to rear of the grate and spaced apart crosswise of the grate, grate members movable to effect downward feeding of fuel over the grate, and lateral extensions on said tubes of such lateral extent that the adjacent extensions of adjacent tubes approximately abut, said grate members being arranged in groups spaced apart longitudinally of the grate and being in overlapping relation to the adjacent extensions of adjacent tubes.

14. A water cooled grate for stokers comprising inclined laterally spaced water tubes extending downwardly from front to rear of the grate and spaced apart crosswise of the grate, lateral extensions on said tubes of such lateral extent that the adjacent extensions of adjacent tubes approximately abut, grate members supported on the adjacent extensions of adjacent tubes in overlapping relation thereto, and means for reciprocating said grate members in a direction lengthwise of the grate, said lateral extensions constituting fuel supporting surface for the grate where such surface is not provided by the grate members, whereby fuel is prevented from falling through the grate as the grate members reciprocate.

15. A water cooled grate comprising alternate cooling tubes and movable grate bars to be cooled thereby, lateral extensions on said cooling members on which the movable members are supported, the adjacent lateral extensions of adjacent cooling members being arranged to approximately abut, and an ash pit, said cooling tubes and the lateral extensions thereof being extended downwardly into the ash pit to form a cooled wall therefor, and said lateral extensions due to their approximate abutting relation preventing excessive flow of air from the ash pit.

WILFRED ROTHERY WOOD.